United States Patent Office 3,131,193
Patented Apr. 28, 1964

3,131,193
SUBSTITUTED NICOTINAMIDES AND
ISONICOTINAMIDES
Claudio Pasini, Monza-Milan, and Paolo Mantegazzini, Milan, Italy, assignors to Società Farmaceutici Italia, Milan, Italy, a corporation of Italy
No Drawing. Filed July 11, 1961, Ser. No. 123,102
Claims priority, application Italy Sept. 15, 1960
8 Claims. (Cl. 260—295)

Our invention relates to new derivatives of benzylamine having antipyretic-analgesic activity, and to a process of preparing them.

Our invention has as an object a new class of nicotinoyl- and isonicotinoyl-, mono- and dibenzylamines substituted or not with methoxy groups in the benzenic ring, and having the general formula:

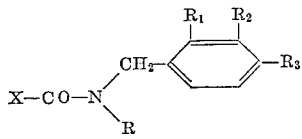

wherein X=3-pyridyl or 4-pyridyl;

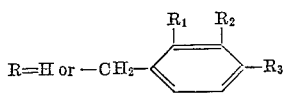

$R_1$, $R_2$ and $R_3$=H or —$OCH_3$, at least one of R, $R_1$, $R_2$ and $R_3$ not being H; and the inorganic salts thereof. The above compounds may also be chemically defined as mono- and dibenzylamines, substituted or not with methoxy groups in the benzenic ring, of nicotinic or isonicotinic acid.

It is known (Alfred Burger: Medicinal Chemistry-Interscience 1951, vol. I, p. 196) that the analgesics with aniline groups may also cause toxic effects, because of the formation of methemoglobin. Acetanilide, for example, may cause nausea, vomiting, diarrhoea, abdominal pain, sommolence, heart palpitation, cyanosis etc., if administered in strong doses and may cause dyspnea, cyanosis, hemolytic anemia, anorexia, insomnia, migraine, mental disorders etc., if administered in protracted doses. The same toxic effects, although not so frequent and less strong, may be brought about by phenacetin, which seems to be the least toxic antipyretic among the substances of the aniline group (A. Burger: ref. cited).

Nicotinoyl- and isonicotinoyl-p.anisidine are described in the literature (C.A. 39, 3118[3]) for which an anaesthetic activity has been pointed out and nicotinoyl- and isonicotinoyl-benzylamine has been reported to show an antispasmodic activity (C.A. 38, 2651[3]; J.A.C.S. 66, 1944, p. 540). Nevertheless these products have not been spoken of as having an antipyretic-analgesic activity.

From a pharmacologic and clinic comparison of the products of our invention with the more significant analogs shown in the literature, i.e. phenacetin, isonicotinoyl-p.anisidine and nicotinoyl-benzylamine, it may be concluded that the derivatives of benzylamine to be illustrated hereafter, unexpectedly show antipyretic-analgesic activity, and have an extremely scarce chronic toxicity with absence of methemoglobinemia and of other toxic effects even after prolonged administration.

The compounds of our invention may be prepared by reacting either the chloride or the anhydride of isonicotinic or nicotinic acid dissolved in an inert organic solvent such as diethyl ether, dioxane, or benzene, with the requisite benzylamine or dibenzylamine derivative in the presence or not of a tertiary amine, such as pyridine, or dimethylaniline. Condensation takes place both in the cold and in the hot, but it is better to mix the reagents at room temperature and then complete the reaction by heating for some time. The reaction product is separated and purified in known manner, preferably by eliminating the solvents and then by dissolving the residue in water, followed by rendering alkaline with sodium or potassium carbonate or bicarbonate or hydroxide and, finally, either by filtering the precipitated product or by extracting it with a water-immiscible solvent.

The pure product may be obtained either by recrystallizing it from a solvent, preferably from water, or by dissolving it in an aqueous acid and precipitating it with alkali.

The corresponding inorganic salts, such as the hydrochloride or the sulfate, may be obtained in known manner by dissolving the mono- or dibenzylamine derivative which is obtained, in aqueous acids, evaporating the solution to dryness, dissolving the residue in a lower aliphatic alcohol, such as methanol, and precipitating the salt with diethyl ether. Among the compounds of the invention those which appear more useful from clinical and pharmacological tests, are:

Nicotinoyl-3,4-dimethoxy-benzylamine or N-(3,4-dimethoxy-benzyl)-nicotinamide (I),
Isonicotinoyl - 3,4 - dimethoxy-benzylamine or N-(3,4-dimethoxy-benzyl)-isonicotinamide (II),
Nicotinoyl-2,3-dimethoxy-benzylamine or N-(2,3-dimethoxy-benzyl)-nicotinamide (III),
Isonicotinoyl - 2,3 - dimethoxy-benzylamine or N-(2,3-dimethoxy-benzyl)-isonicotinamide (IV),
Isonicotinoyl-4-methoxy-dibenzylamine or N-(4-methoxy-dibenzyl)-isonicotinamide (V),
Nicotinoyl-(3,3',4,4'-tetramethoxy)-dibenzylamine or N-(3,3',4,4' - tetramethoxy - dibenzyl)-nicotinamide (VI), and
Isonicotinoyl - (3,3',4,4'-tetramethoxy)-dibenzylamide or N-(3,3',4,4' - tetramethoxy - dibenzyl)-isonicotinamide (VII).

Nicotinoyl-3,4-dimethoxy-benzylamine (I) seems to be the most interesting product from the therapeutic point of view.

The compounds of the invention are white microcrystalline powders, stable both to heat and light. They may preferably be administered orally or rectally in the form of a suppository. In pharmacological tests, they have been suspended in a 5% solution of gum Arabic and injected in the peritoneal cavity of the animal. In hospitals, they have been used in tablets, capsules, suspensions or other dosage unit form, for oral administration with a significant quantity of pharmaceutically acceptable carrier or either a solid or liquid diluent. Such pharmaceutically acceptable carriers include diluents and starch, lactose, talc, magnesium stearate, pectine, gelatins and water for oral administration and theobroma oil and white waxes for suppositories. The percentage of active ingredient varies according to the particular pharmaceutical form. Most suitable pharmaceutical compositions contain from 5 to 100% by weight of the active ingredient optionally in admixture with other therapeutically active compounds (such as barbiturates, analgesics-antipyretics, antihistaminics, calcium gluconate and vitamins). The following table shows the LD 50 rat, the AD 50 rat and the LD 50:AD 50 rat ratios which may be considered as a therapeutic index of the compounds of the invention in comparison to those of phenacetin, isonicotinoyl-p.anisidine and nicotinoyl-benzylamine. The compounds of our invention, when dissolved in an acid medium at a dose of 100 mg./kg. and administered intravenously in the animals, do not noticeably alter either the arterial blood pressure, or the rhythm and breathing amplitude, neither do they modify the pressure response to acetylcholine and to histamine. The antipyretic-analgesic effect lasts about 2 hours in the animals at the indicated doses. The ratio between oral active dose and peritoneal active dose is favorable (about 6). This means that there is good absorption at the level of the gastroenteric tube.

TABLE

| Compound | LD 50 rat | AD 50 rat | LD 50/AD 50 rat |
|---|---|---|---|
| Phenacetin | 650 | 150 | 4.3 |
| Isonicotinoyl-p.anisidine | 700 | 120 | 5.8 |
| Nicotinoyl-benzylamine | 420 | 75 | 5.7 |
| I | 520 | 70 | 7.4 |
| II | 500 | 110 | 4.5 |
| III | 350 | 110 | 3.2 |
| IV | 150 | 40 | 3.8 |
| V | 400 | 75 | 5.3 |
| VI | 600 | 120 | 5 |
| VII | 400 | 130 | 3.1 |

LD 50: Drug lethal dose, expressed in mg./kg., which when administered intraperitoneously kills 50% of the treated animals in 48 hours.
AD 50: Drug analgesic dose, expressed in mg./kg., which when intraperitoneously administered, causes complete analgesia in 50% of the treated animals.

The products of the invention are primarily considered antipyretic-analgesics, although they are also active as tranquillizers.

In hospitals, the compounds of the present invention have shown symptomatic efficacy against muscular and articular aches, head- and toothache in particular. Morphological and functional tests on patients have not shown any toxic effect even after prolonged treatment, while treatment with phenacetin at doses having the same therapeutic effect causes remarkable alternations to the hematic crasis and to the hepatic function.

Preferable posologies for human beings are 1–3 tablets daily, each containing 0.2–0.25 g. of active product or 1–3 suppositories daily, each containing 0.1 g. of active product. The active dose is therefore 2–15 mg./kg. daily, according to the prescriptions.

The following examples which illustrate the invention with respect to the chloride of isonicotinic acid and nicotinic acid (the anhydrides of isonicotinic acid and nicotinic acid react analogously), are not intended to limit the scope of the invention.

*Example 1*

NICOTINOYL-3,4-DIMETHOXY-BENZYLAMINE (I)

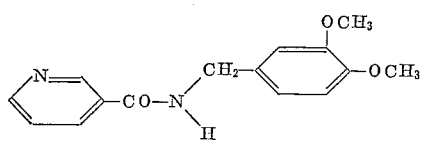

The crude hydrochloride of nicotinic acid chloride, which is obtained by chlorination of 3.3 g. nicotinic acid with 17 cc. thionyl chloride ($SOCl_2$) with refluxing for about 1 hour and after that by evaporation of the solution to dryness under vacuum, is suspended in 12 cc. of anhydrous pyridine. To the suspension a solution of 3 g. veratrylamine in 12 cc. pyridine is added quickly with stirring, over-heating being avoided by means of an ice-bath. Stirring is effected for a few hours, then the solution is allowed to stand overnight. The precipitate of the hydrochloride of pyridine is removed by filtration and the pyridinic solution is evaporated under vacuum on a water-bath. The oily residue is treated with a 10% sodium carbonate ($NA_2CO_3$) solution until it gives a fully alkaline reaction and is steam-distilled to complete the elimination of the pyridine.

An oily substance remains in the aqueous liquid which solidifies on cooling and rubbing. The white substance, (I), is filtered, washed with water and dried in the air. It melts at 99–100° C.

*Example 2*

ISONICOTINOYL-3,4-DIMETHOXY-BENZYLAMINE (II)

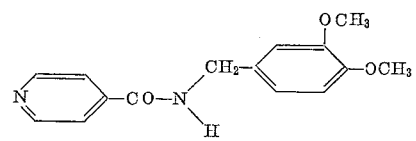

To a mixture of 1.3 g. veratrylamine in 5 cc. anhydrous ether and 0.61 cc. anhydrous pyridine, a solution of 1.1 g. isonicotinoylchloride in 7 cc. of anhydrous ether is added by dropping quickly at room temperature with stirring. Stirring is effected for about 1 hour. A solid separates which is filtered and washed with ether. The product is treated with water and rendered alkaline with 10% sodium carbonate ($Na_2CO_3$) solution. After cooling for a few hours, the solution is filtered and washed with 10% sodium carbonate ($Na_2CO_3$) water to neutrality and finally with ether.

After recrystallization from a water-alcohol (1:1) mixture, compound II is obtained melting at 97.5–98° C.

*Example 3*

NICOTINOYL-2,3-DIMETHOXY-BENZYLAMINE (III)

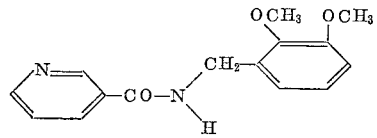

To the crude hydrochloride of nicotinic acid chloride, which is obtained by chlorination of 1.5 g. nicotinic acid with 10 cc. thinoyl chloride as described in Example 1, 15 cc. of anhydrous dioxane, 1.95 cc. of anhydrous pyridine and 1 g. of 2,3-dimethoxy-benzylamine are added. The mixture is heated under reflux for 1 hour, then as much as possible of the solvent is distilled off under vacuum. The syrupy residue is treated with water, rendered alkaline with 10% sodium carbonate ($Na_2CO_3$) and extracted with ether repeatedly. The extracts are collected, dried on sodium sulfate ($Na_2SO_4$) and evaporated to dryness, leaving an oily residue which is boiled with water (preferably steam distilled) until any trace of pyridine disappears. The solution is cooled on ice. On rubbing the oil solidifies. The solid is pulped, washed with water and dried in the air to give 1.4 g. of crude compound III which after recrystallization from water, melts at 102–103° C.

*Example 4*

ISONICOTINOYL-2,3-DIMETHOXY-BENZYLAMINE (IV)

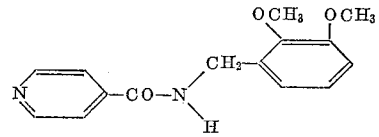

The crude hydrochloride of nicotinic acid chloride, which is obtained by chlorination of 1.5 g. isonicotinic acid with 10 cc. of thionyl chloride ($SOCl_2$) as described in Example 1, is suspended in 20 cc. of anhydrous ether and 2.5 cc. of anhydrous pyridine. To the suspension, a solution of 1 g. 2,3-dimethoxy-benzylamine in 10 cc. of ether is added quickly and with stirring. After a few hours, 30 cc. of water are added, the product is rendered alkaline with 10% sodium carbonate ($Na_2CO_3$) solution and extracted repeatedly with ether, in which the solid separated by the treatment with soda partially dissolves. The ethereal extracts are dried on sodium sulfate ($Na_2SO_4$) and evaporated to dryness leaving a residue which crystallizes from water to give compound IV in white crystals melting at 139–140° C.

Example 5

ISONICOTINOYL-4-METHOXY-DIBENZYLAMINE (V)

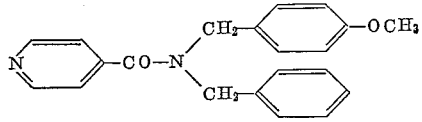

To a solution of 2 g. 4-methoxy-dibenzylamine and 1.3 cc. anhydrous pyridine in 30 cc. anhydrous ether, a solution of 2.3 g. isonicotinoyl chloride in 30 cc. anhydrous ether is added with stirring. A thick white mass is formed, which, after 30 minutes, is pulped in an excess of 10% sodium carbonate ($Na_2CO_3$) solution and extracted with ether.

The evaporated ethereal liquid leaves an oily residue which is boiled with water in order to remove the rest of pyridine traces, while reducing the volume to no more than 20 cc. Slight acidification with concentrated hydrochloric acid and cooling follow. A significant quantity of 4-methoxy-dibenzylamine, in the form of a not very soluble hydrochloride, is separated.

The precipitate is filtered and the filtrate evaporated to dryness. The residue is recrystallized by dissolving it in very little methanol and precipitating with ether, to give compound V having a melting point between 160° and 195° C. with progressive loss of hydrogen chloride.

Example 6

NICOTINOYL-(3,3',4,4'-TETRAMETHOXY)-DIBENZYLAMINE (VI)

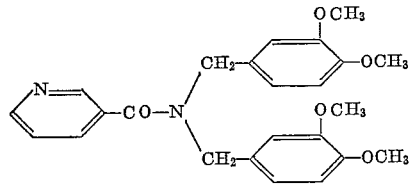

To crude hydrochloride of nicotinic acid chloride, obtained by chlorination of 3 g. of nicotinic acid with 20 cc. of thionyl chloride ($SOCl_2$) as described in Example 1 suspended in 30 cc. of anhydrous dioxane and 3.9 cc. of anhydrous pyridine, 2 g. of 3,3',4,4'-tetramethoxy-dibenzylamine are added. Heating follows under reflux in a thermo-regulated bath at 130° C. for 1 hour. The solvent is evaporated under vacuum. The residue is pulped with 10% sodium carbonate ($Na_2CO_3$) solution and the pulverulent precipitate is filtered, washed and recrystallized from water. Compound VI is obtained in the form of little white needles which melt at 110–112° C.

Example 7

ISONICOTINOYL-(3,3',4,4'-TETRAMETHOXY)-DIBENZYLAMINE (VII)

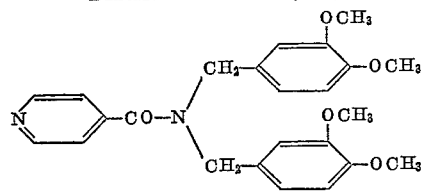

To the crude hydrochloride of isonicotinic acid chloride, which is obtained by chlorination of 3 g. isonicotinic acid with 20 cc. thionyl chloride ($COCl_2$) as described in Example 1 and suspended in 30 cc. of anhydrous dioxane and 4 cc. of anhydrous pyridine, 2 g. of 3,3',4,4'-tetramethoxy-dibenzylamine are added. Heating to 70° C. follows for 2.30 hours. The solvent is evaporated under vacuum and the residue is pulped with a 10% solution of sodium carbonate ($Na_2CO_3$).

The precipitate is filtered, washed with water and recrystallized from methanol. Compound VII is obtained which melts at 111—113° C.

The reactions, as described in the above examples, also take place when condensation is carried out in the presence of other t. amines, such as dimethylamine.

Obviously, many modifications and variations of the present invention are possible in light of the above teachings. It is therefore to be understood that within the scope of the appended claims, the invention may be practised otherwise than as specifically described.

We claim:
1. Nicotinoyl- and isonicotinoyl-, mono- and dibenzylamines which may be substituted by methoxy groups in the benzene ring, having the formula:

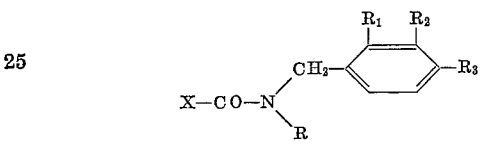

wherein X is selected from the group consisting of 3-pyridyl and 4-pyridyl, R is selected from the group consisting of

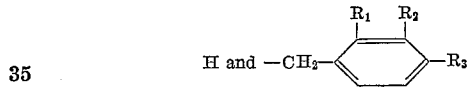

$R_1$, $R_2$ and $R_3$ are selected from the group consisting of H and —$OCH_3$, at least one of R, $R_1$, $R_2$ and $R_3$ not being H; and the nontoxic pharmaceutically acceptable inorganic acid addition salts thereof.

2. N-(3,4-dimethoxy-benzyl)-nicotinamide.
3. N-(3,4-dimethoxy-benzyl)-isonicotinamide.
4. N-(2,3-dimethoxy-benzyl)-nicotinamide.
5. N-(2,3-dimethoxy-benzyl)-isonicotinamide.
6. N-(4-methoxy-dibenzyl)-isonicotinamide.
7. N - (3,3',4,4' - tetramethoxy - dibenzyl) - nicotinamide.
8. N - (3,3',4,4' - tetramethoxy - dibenzyl) - isonicotinamide.

References Cited in the file of this patent

UNITED STATES PATENTS 2,483,250    Suter _____ Sept. 27, 1949

FOREIGN PATENTS 1,170,134    France _____ Sept. 22, 1958

OTHER REFERENCES

Chemical Abstracts, vol. 36, pp. 7239–40 (1942), abstracting Hukusima J. Chem. Soc., Japan, vol. 61 pp. 121-4 (1940).

Hey et al.: J. Chem. Soc. (1951), pp. 1527–32.

Phillips: JACS, vol. 75, pp. 3621-2 (1953).